April 11, 1967 C. J. PETERS 3,313,938
TRANSMISSION LINE LIGHT MODULATOR
Filed May 18, 1962 2 Sheets-Sheet 1

INVENTOR.
CHARLES J. PETERS
BY
*Spencer E. Olson*
ATTORNEY

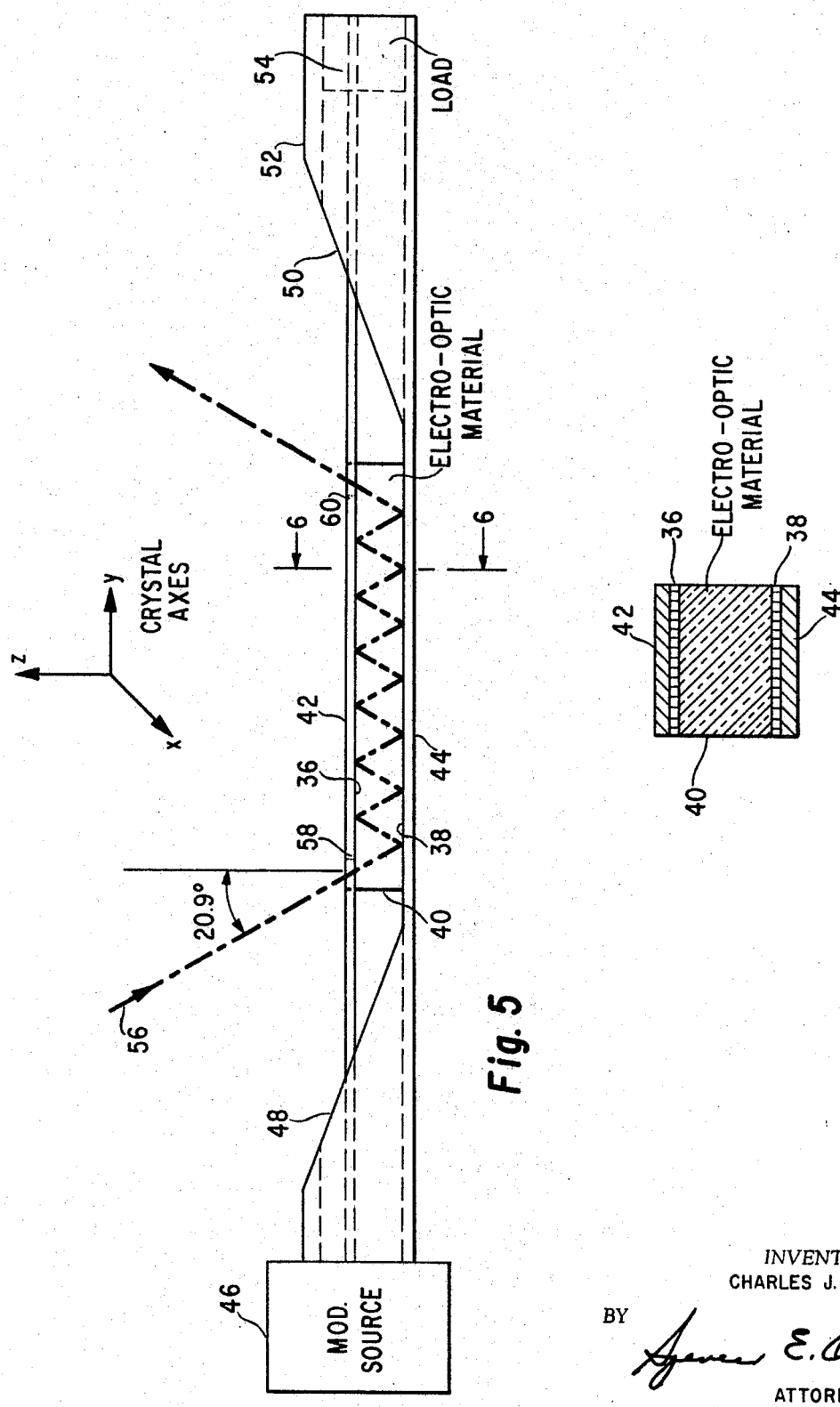

United States Patent Office 3,313,938
Patented Apr. 11, 1967

3,313,938
TRANSMISSION LINE LIGHT MODULATOR
Charles J. Peters, Wayland, Mass., assignor to Sylvania Electric Products Inc., a corporation of Delaware
Filed May 18, 1962, Ser. No. 195,880
13 Claims. (Cl. 250—199)

This invention relates generally to light modulators, and is particularly concerned with the frequency or phase modulation of plane-polarized light.

The use of modulated light beams in guidance and control systems has several advantages over conventional microwave-radar systems, among them being more accurate discrimination between targets and the requirement for less power. A number of methods have been available for modulating light beams at low frequencies, but not until relatively recently have devices been developed which are feasible in the microwave region. Of the latter devices of which applicant is aware the light beam is intensity-modulated by employing the electro-optic retardation properties of a properly cut crystal of the dihydrogen phosphate variety, such as $NH_4H_2PO_4$ (ADP) and $KH_2PO_4$ (KDP). Attempts to use modulators of this type in continuous duty applications have been limited to bandwidths in the low video frequency range, not by the KDP or ADP reaction, but by the exceedingly high modulation power requirements with the attendant heating of the modulator cell. In order that advantage can be taken of the tremendous information-carrying capability of the coherent light beam output of a laser (Light Amplification by Stimulated Emission of Radiation) for communications and intelligence purposes, it is essential to provide means for impressing wide-band information on optical carrier beams, and means for retrieving that information.

It is, accordingly, a general object of this invention to provide a modulator for light.

Another object of the invention is to provide frequency or phase modulation of plane-polarized coherent light.

Still another object is to provide a modulator capable if impressing wide-band information, on a beam of coherent light with a modulating source of moderate power, and in which the modulating power is independent of bandwidth.

Another object of the invention is to provide a wide-band modulator for plane-polarized coherent light which is relatively simple to construct and which is useful over a large range of light frequencies.

Broadly, these objects are attained through the utilization of the electro-optic effect exhibited by certain materials, such as crystals of the dihydrogen phosphate type of which KDP and ADP are examples. The electro-optic material is combined with a section of a traveling wave structure of the transverse electromagnetic (TEM) type, the electro-optic material being arranged with respect to the conductors of the traveling wave structure so as to constitute at least a portion of the dielectric of the traveling wave structure. In its simplest form, the traveling wave structure is a parallel plate transmission line, which inherently has a very wide bandwidth, with the electro-optic material positioned between the conductors. A source of modulation, such as a traveling wave tube or other device capable of delivering a modulation signal at the required power level, is coupled to one end of the transmission line and the modulation signal is propagated therethrough at a velocity determined by the transmission characteristics of the line. After passage through the line section, the modulating signal is dissipated in a suitable load. A light beam to be modulated, such as a narrow beam of coherent light from a laser, is directed through the electro-optic material along the length direction of the transmission line section. By virtue of the modulating signal propagating through the line, velocity of propagation of the light through the electro-optic material is modulated by a small amount which results in phase modulation of the light beam emerging from the modulator.

An important feature of the invention is the matching of the velocity of the modulation signal through the modulator to the velocity of the light through the modulator over a broad band of modulating frequencies. This is accomplished in one embodiment of the invention by employing electro-optic material as a part of the dielectric between the conductors of a parallel plate transmission line of suitable dimensions, the apportionment between air and the high dielectric constant electro-optic material being such that the velocity of the light, directed through the electro-optic material and along the long axis of the transmission line, is equal to the velocity of the modulating signal on the composite transmission line. As an alternate to this embodiment, the transmission line may be of the coaxial type, with a radially oriented slab of electro-optic material positioned between the inner and outer conductors.

In another embodiment, the velocity of the modulating signal is matched to the velocity of the light through the modulator by providing the faces of the electro-optic material which are contiguous with the conductors of the parallel plate transmission line with a highly reflective surface, and injecting the light beam into the electro-optic material at an angle such that it experiences multiple reflections from the two reflective surfaces in traveling from one end of the modulator to the other. By proper selection of this angle, the time of travel of the light along the zigzag path equals the time of travel of the modulation signal through the modulator.

Both of these briefly described embodiments of the invention are capable, in structures of practical dimensions, of providing a satisfactory index of modulation with very modest modulation power. A significant feature of the device is that the modulation power is independent of the bandwidth of the modulation signal, and the bandwidth in turn, is limited only by the propagation characteristics of the transmission line structure.

Other objects, features and advantages of the invention will become apparent, and a better understanding of its construction and operation will become apparent from the following detailed description taken in conjunction with the accompanying drawings, in which:

FIG. 5 is a side view, partially diagrammatic, of another embodiment of the invention; and FIG. 6 is a cross-sectional view taken along line 6—6 of FIG. 5.

Figure 1:
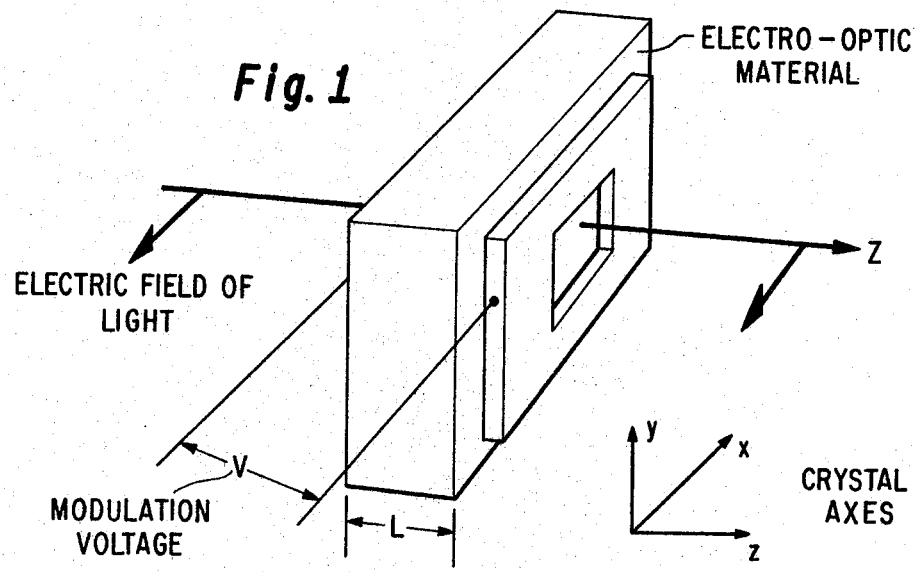
FIG. 1 is a perspective view, somewhat diagrammatic, of a simple light modulator, useful in explaining the manner in which the electro-optic effect is utilized in the present invention.

As has been mentioned, operation of the present modulator is based on modulating the velocity of propagation of light through an electro-optic material by applying a voltage to the material. Crystals of the dihydrogen phosphate type, such as ammonium dihydrogen phosphate (ADP), potassium dihydrogen phosphate (KDP), and potassium duo deuterium phosphate, exhibit the electro-optic effect to a pronounced degree. Certain liquids also exhibit this effect. In the description which follows, KDP will most frequently be referred to as the electro-optic material, but it is to be understood that the advantages of the invention can also be achieved with other materials of this family of compounds, or with other electro-optic materials.

The electro-optic effect, in terms of velocity of propagation, is the change in the velocity of light, $\Delta U_x$, in response to an electric field. If $E_z$ is applied parallel to the z-axis of a crystal, this change in velocity is given by $$\frac{\Delta U_x}{C} = -\frac{1}{2}r_{63}n^2 E_z \qquad \text{Eq. 1}$$

where $U_x$ is the velocity of linearly polarized light which has its electric vector parallel to the x-axis of the crystal. KDP crystals are anisotropic, and in this description, and in the claims, the crystallographic convention that the x- and y-axes correspond to the minor axes of the reciprocal index of refraction ellipsoid has been followed. To state that the electric vector of the light is parallel to the x-axis does not completely specify the direction of travel of the light, for it may be traveling in any direction in the y, z plane and still have its electric vector parallel to the x-axis. Thus, light traveling in the x, z plane will also experience the variation in velocity expressed by Eq. 1, which for polarized light with its electric vector in the y direction may be written $$\frac{\Delta U_y}{C} = +\frac{1}{2}r_{63}n^2 E_z \qquad \text{Eq. 2}$$

where $U_y$ is the velocity of linearly polarized light with its electric vector parallel to the y-axis of the crystal. In Equations 1 and 2, $E_z$ is the applied voltage gradient in volts/meter
$n$ is the index of refraction
$C$ is the velocity of light in vacuo
$\Delta U$ is the change in velocity of propagation
$r_{63}$ is the electro-optic constant defined in the literature, which for KDP is $1.05 \times 10^{-11}$ meter/volt.

It will be noted from these equations that the velocity $U_x$ decreases, while the velocity $U_y$ increases for positive values of $E_z$. This results because the electro-optic effect can be considered to be the change of the optic dielectric constant observed along the x- and y-axes as the result of the field applied along the z-axis. Since the dielectric constant along one axis increases, while the dielectric constant along the other axis decreases, the velocity of propagation, which is directly related to the dielectric constant, changes correspondingly. From the foregoing, it follows that linearly polarized light with its electric vector parallel to either the x- or y-axis will pass through the crystal without any change occurring in the plane of polarization. This is true for all values of the applied field $E_z$. The only effect on light of the above description is a variation in the velocity of propagation depending upon $E_z$.

Referring now to FIG. 1, consider that a linearly polarized light wave is traveling through a slab of electro-optic material with the electric field of the light parallel to the x-axis of the crystal. If the light path through the slab is of length L, and the light is traveling at a velocity U, the time taken to traverse the slab is $$T = \frac{L}{U}$$

If the light wave has an angular frequency $\omega$ then the phase of the emerging wave with respect to the entering wave is related to the velocity in the slab by $$\phi = \omega T = \frac{wL}{U}$$

Phase modulation (which is in all respects identical to the frequency and phase modulation so common at the radio frequency) can be accomplished by varying this phase angle in accordance with a modulation signal, applied to the crystal in a direction parallel to its z-axis. The change or modulation of the phase angle, $\Delta \phi$, is related to the change in the velocity of propagation by $$\Delta\phi = \frac{-\omega L}{U^2}\Delta U \qquad \text{Eq. 3}$$

The maximum value of $\Delta U$ in the context of the present invention is of the order of one part in $10^8$ to one part in $10^6$. If Eq. 1 is substituted for $\Delta U$, the phase change in terms of applied field is $$\Delta\phi = \frac{\omega C n^2 r_{63}}{2U^2} L E_z \qquad \text{Eq. 4}$$

Recognizing that $LE_z$ is the total applied voltage, and that $C/U = n$, Eq. 4 can be simplified to read $$\Delta\phi = +\frac{\omega n_x^4 r_{63}}{2C} V_z \qquad \text{Eq. 5a}$$

or $$\Delta\phi = +\frac{\pi n_x^5 r_{63}}{\lambda} V_z \qquad \text{Eq. 5b}$$

where $\lambda$ is the wavelength of the light to be modulated. It will be seen that the phase shift is directly proportional to the applied voltage. However, it can be shown by substituting practical values of $n$ and $\lambda$ in Eq. 5b that modulation voltages in the kilovolt range would be required to produce an adequate modulation index for communications purposes. The high voltage, coupled with the high losses that can be shown will occur in the KDP crystal at this modulation power level makes the simple device of FIG. 1 impractical for bandwidths exceeding a few megacycles.

Figure 2:
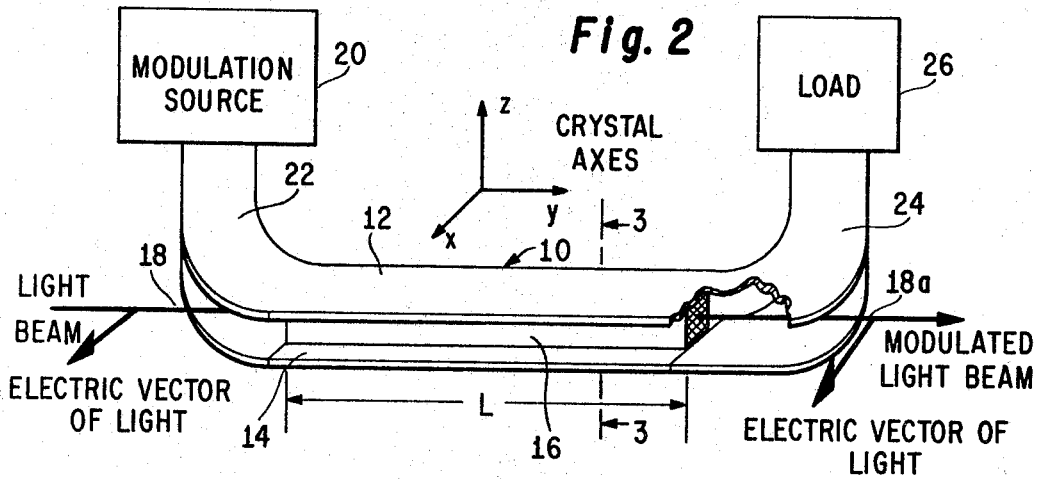
FIG. 2 is a side view, partially diagrammatic, of one embodiment of the invention.
Figure 3:
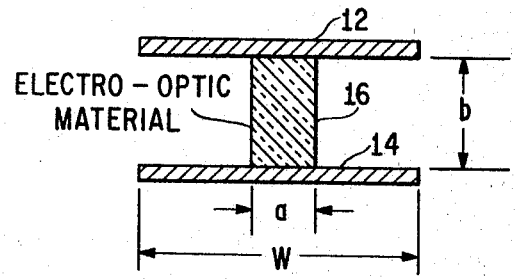
FIG. 3 is a cross-sectional view taken along line 3—3 of FIG. 2.

The present invention overcomes this shortcoming by, in effect, subjecting each element of the coherent light wave to a relatively smaller modulation voltage a multiplicity of times as it passes through the electro-optic material. This is accomplished by conducting the modulating signal along a transmission line of which at least a portion of the dielectric consists of electro-optic material, and directing the light beam to be modulated through the electro-optic material generally along the length direction of the transmission line. FIGS. 2 and 3 illustrate one modulator structure embodying this concept, which consists of a section of parallel conductor transmission line 10, having spaced apart conductive plates 12 and 14 of length L between which is positioned a slab 16 of electro-optic material, such as KDP or ADP, and which constitutes a portion of the dielectric of the line. A beam 18 of plane-polarized light from a suitable source, which may be coherent light from a laser, (not shown) is directed to travel parallel to the longitudinal axis of the transmission line and within the KDP crystal, the axes of the crystal being oriented as indicated. A source of modulation 20, which may be a magnetron, a klystron, or a traveling wave tube, capable of operating at microwave frequencies, is coupled to the end of transmission line 10 to which the beam is applied through a suitable wave-guide transition 22. At the other end of the line section, the modulation energy is coupled through another wave guide transition 24 to a load 26, where it is dissipated. The modulated light beam 18a emerges from this end also, continuing in the direction of the long axis of the transmission line.

The analysis of the modulator of FIG. 2 is very similar to that of the single pass device of FIG. 1. Consider that a linearly polarized coherent light wave is traveling through the slab 16 of KDP with the electric vector of the light parallel to the x-axis. If the light is traveling at velocity U, the time, T, taken to traverse the slab is L/U, and if the light wave is of angular frequency $\omega$, the phase of the emerging wave with respect to the entering wave is related to the velocity in the slab by $$\phi = \omega T = \frac{\omega L}{U}$$

This phase angle is varied in accordance with the modulation signal from source 20 to achieve phase modulation, the change of the phase angle, $\Delta\phi$, being related to the change in the velocity of propagation by $$\Delta\phi = -\frac{\omega L}{U^2}\Delta U \qquad \text{Eq. 6}$$

Substituting Eq. 1 for $\Delta U$, the change in phase in terms of the applied field is $$\Delta\phi = \frac{\omega C n^2 r_{63}}{2U} L E_z \qquad \text{Eq. 7}$$

This equation is identical to Eq. 4 for the single pass device; however, in the device of FIG. 2, L is measured along the transmission line, and $E_z$ is the modulation electric field applied to the KDP by the transmission line from source 20. The effect of the field $E_z$ on light whose electric vector is parallel to the x-axis is to change the dielectric constant observed along the x-axis at light frequencies. The velocity of propagation of light in a medium is equal to $$\sqrt{\frac{1}{\epsilon\mu}}$$

where $\epsilon$ is the dielectric constant of the medium and $\mu$ is the permeability.

The light beam is subjected to the field $E_z$ throughout the length of the slab of KDP, thereby achieving a great reduction in modulator drive power. Stated another way, directing the light along the long axis of the slab causes it to traverse the modulation voltage many times. This is accomplished by matching the velocity of the light in the KDP to the velocity of the modulation signal in the transmission line. The extremely small change in velocity brought about by the modulation, noted earlier, does not negate the equality of the light and modulation signal velocities. As will be seen from the following design considerations, which are by way of example only, it is possible to achieve this with a line of practical dimensions, which at the same time offers a convenient characteristic impedance, for example, 50 ohms. Assume that it is desired to obtain a modulation index of unity, and that this is to be accomplished with a modulation level of 54 volts peak, or 30 watts. Referring to FIG. 3, which is a cross-sectional view of the modulator, the width dimension $a$ of the slab of KDP is less than the width W of the strips 12 and 14 whereby a portion of the dielectric of the transmission line is KDP and the balance is air. The velocity of propagation for the modulation signal on this composite transmission line is $$\frac{V}{C} = \left[\frac{1}{\frac{W-a}{W} + \frac{\epsilon_1 a}{W}}\right]^{1/2} \qquad \text{Eq. 8}$$

where V is the velocity of the modulation signal and $\epsilon_1$ is the dielectric constant of KDP. Equating V to U, where U is the velocity of light in KDP and remembering that $$\frac{U}{C} = \frac{1}{n}$$

the reciprocal of the index of refraction of the KDP, and solving Eq. 8 for the width W of the strips $$W = \frac{a(\epsilon_1 - 1)}{n^2 - 1} \qquad \text{Eq. 9}$$

If the dimension $a$ is arbitrarily chosen to be one millimeter, with $\epsilon_1 = 20.2$ and $n = 1.468$, the width W is 16.45 millimeters. The characteristic impedance $Z_0$ of this composite line is $$Z_0 = \left[\frac{\mu_0 b^2}{W \epsilon_0 [W - a + \epsilon_1 a]}\right]^{1/2} \qquad \text{Eq. 10}$$

where $b$ is the height of slab 16, and $\mu_0$ and $\epsilon_0$ are respectively the dielectric constant and permeability of air. Substituting a value of 50 ohms (the desired characteristic impedance) for $Z_0$ and inserting the previously determined dimensions for $a$ and W, solution of this equation gives a value of 3.22 millimeters for $b$. Since V has been made equal to U, the phase change per unit length from Eq. 5a is $$\frac{\Delta\phi}{L} = \frac{\omega n^3}{2V} r_{63} E_z = \frac{\pi r_{63} n^4 E_z}{\lambda} \qquad \text{Eq. 11}$$

For the assumed value of a modulation signal of 54 volts peak, and a height dimension $b$ of 3.22 millimeters, the voltage gradient $E_z$ across the slab of KDP is $$E_z = \frac{54 \text{ volts}}{3.22 \text{ meters}} \times 10^3 = 1.68 \times 10^4 \text{ volts/meter}$$

so that $$\frac{\Delta\phi}{L} = 2.5 \text{ radians/meter}$$

A modulation index of unity can be obtained within the above constraints with a modulator length of 40 centimeters at a light wave length corresponding to that of the He-Ne gas laser, namely, 1.15 microns. Considering that KDP is virtually transparent, this length is not excessive. At present, single crystals of KDP of this length are not available, however, making it necessary to place a number of smaller crystals end-to-end to achieve the desired length. Small gaps between the crystals and the transmission line strips are filled with a fluid having a high viscosity and high dielectric constant, such as cyanoethyl sucrose, and the joints between crystals are filled with a liquid which matches the index of refraction of the KDP.

While a length of 40 centimeters has been calculated in the above example, it will be appreciated that the length can be reduced by decreasing the smaller dimension $a$ of the KDP below the assumed one millimeter, by increasing the modulator power, by decreasing the wavelength of the light, or by substituting a more active material for the KDP. In the latter connection, if the hydrogen in KDP is replaced with deuterium, the electro-optic coefficient $r_{63}$ will be increased by a factor of between 2 and 5. Thus, to achieve the degree of modulation indicated above, a modulator with the calculated cross-sectional dimensions but using potassium duo deuterium phosphate as the crystal would be only ½ to ⅕ as long; namely, 8 to 20 centimeters long. Or conversely, the length may be kept at 40 centimeters and the modulator voltage reduced by a factor of ½ to ⅕ with an attendant reduction in modulation power by a factor of ¼ to ¹⁄₂₅. The doubt in the actual value of $r_{63}$ for the deuterated crystal exists because good, large crystals of this material are not yet available.

Figure 4:
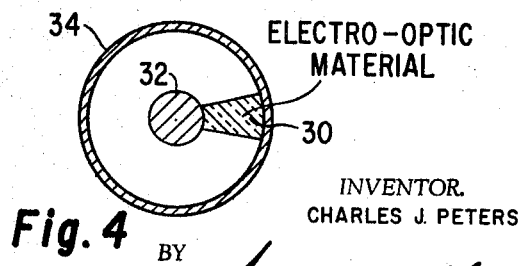
FIG. 4 is a cross-sectional view of an alternate construction of the embodiment of FIG. 2.

Although the description thus far has been directed to a modulator in which the transmission line is of the parallel plate type, the advantages of the combination of an electro-optic material as a part of the dielectric in a broad band transmission line are also realizable in a coaxial line of the form shown in FIG. 4. A coaxial line being essentially a special form of parallel plate line, the slab 30 of KDP may be positioned to extend radially from the inner conductor 32 to the outer conductor 34 of the line. Using an approach similar to that outlined above, the required thickness of the crystal for selected diameters for the inner and outer conductors to match the velocities of the modulation signal in the line to the velocity of the light in the KDP can be readily determined. As in the modulator of FIG. 2, the light beam is directed through the KDP along its length axis, with the light polarized such that the electric vector of the light is parallel to the x-axis of the crystal.

The ultimate bandwidth of both modulator configurations is determined by the frequency range over which the velocity of the modulating signal is substantially constant, this velocity being determined by the type of transmission line structure and the dielectric constant of the line. Available data indicates that the dielectric constant of KDP is substantially constant at least up to 25 kilomegacycles, and that the dielectric constant of ADP is substantially constant up to 36 kilomegacycles. The behavior of parallel conductor transmission lines is independent of frequency up to frequencies at which the cross-sectional dimensions become comparable to a wavelength. The cross-sectional dimensions of the line being of the order of millimeters (in the above example) this effect will not become apparent until the modulation frequency exceeds tens of kilomegacycles. As a practical matter, the bandwidth of the modulator is determined by the cross-sectional dimensions of the transmission line for which the machineability of ADP or KDP crystals sets a minimum size.

Referring now to FIGS. 5 and 6, in this embodiment of the invention, the reduction in modulator drive power is achieved by directing the light beam along a path in the electro-optic material so that the modulation voltage is traversed many times. Multiple traverses of the modulation voltage are accomplished by applying reflective surfaces, such as mirrors 36 and 38, to opposite surfaces of a crystal of electro-optic material 40, such as KDP, and placing this crystal between the conductors 42 and 44 of a parallel wire, or parallel plate, transmission line with the mirrors contiguous with the conductors of the line. A source of modulation 46, which may be a klystron or other source of alternating current signals, is coupled to one end of the parallel plate transmission line section through a suitable transition 48. The other end of the modulator is coupled through another transition 50 capable, for example, of coupling a parallel wire transmission line to a co-axial line 52, the latter having a dissipative termination 54 in which the modulation signal energy is absorbed. A beam 56 of plane polarized light to be modulated is injected into the modulator through an opening 58 in one of the conductors of the transmission line, for example, the upper conductor 42 as shown. The light beam is injected at an angle to the vertical determined by the relative velocities of light in the electro-optic material and the modulation on the transmission line in a manner to be described. After a predetermined number of reflections have occurred, the modulated light beam emerges through another opening 60 in one of the conductors of the transmission line, for example, the upper conductor 42 as shown.

In each bounce of the light from one mirror to the other, the light receives an increment of modulation equal to the voltage across the transmission line at the then location of the light. In order that an element of the light will always be subjected to the same modulation voltage, the velocity of the light along the transmission line is equated to the velocity of the modulation voltage down the line. This is possible because the velocity of light in the electro-optic material is greater than the velocity of the microwave modulation in the transmission line. If KDP is used as the electro-optic material, and C is the velocity of light in vacuo, the velocity of the light in the KDP is about 0.682 C and the velocity of the modulation on the transmission line having KDP as its dielectric is 0.233 C. It can readily be shown that the two velocities are matched if the light beam is slanted at an angle of 20.9 degrees in the crystal.

Referring back to Equations 5a and 5b, which relate the phase deviation to applied voltage, it is seen that the increments of modulation obtained from each bounce accumulate rather than cancel. These equations contain no specification for the direction of travel of the light; however, Eq. 5a applies to light which has its electric vector parallel to the $x$-axis of the electro-optic material, while Eq. 5b applies to light which has its electric vector parallel to the $y$-axis. Considering for the moment plane-polarized light with its electric field parallel to the $x$-axis, the modulation, $\Delta\phi$, is given by Eq. 5a whether the light is traveling in the positive $z$ direction or in the negative $z$ direction, or even at some angle to the $z$-axis in the $y$, $z$ plane. This equation also states that the phase shift is proportional to the applied voltage traversed by the light wave; thus, if a light wave goes through a particular voltage increment 100 times, the phase shift is equivalent to passing once through a voltage of 100 times this increment. As will be seen from the following design considerations of a practical modulator, the dimensions of which are by way of example only, 100 is a reasonable number of reflections in the modulator.

Assuming the same performance requirements as for the modulator of FIG. 2, namely, a modulation index of unity to be accomplished with a modulation signal of 54 volts peak, suitable dimensions for the modulator are: length of line section, 3.936 inches; spacing between transmission line conductors, 0.110 inch; and, width of the electro-optic crystal, 0.185 inch. These dimensions contemplate a light beam which is one millimeter in diameter. A structure of these dimensions and configuration, using KDP as the electro-optic material, has a characteristic impedance of 50 ohms. To minimize dispersion of the light beam within the modulator, the flatness tolerance on the crystals is ±60 microinches. Because of limitations in growing crystals of electro-optic materials, such as KDP, the length of 3.936 inches is achieved by placing a number of crystals end to end, the discontinuities thus introduced being tolerable if the aforementioned flatness tolerances are maintained.

At light frequencies of current interest, i.e., having wavelengths of 0.4 micron to 1.3 microns, the attenuation of light in KDP is very small, and consequently there is little loss of light due to absorption in the electro-optic material. However, because of the unavailability of perfect mirrors, there is a small loss in light at each reflection. Reflectances of 99% are well within the state of the art, however, which will result in 37% of the incident light appearing at the output of a modulator in which there are 100 reflections. Should the loss of light within the modulator become a serious problem, this being an area of design compromise, the number of reflections may be reduced and the modulation power increased accordingly. If the number of reflections is reduced to 50, the transmitted light for mirrors having 99% reflectance becomes 61%.

The design parameters of the multi-reflection modulator described above are predicated on using KDP as the electro-optic material. As was mentioned earlier, it is known that replacing the hydrogen in KDP with deuterium will increase the electro-optic coefficient $r_{63}$ by a factor of between 2 and 5. This means that the modulator voltage required to attain a given degree of modulation for potassium duo deuterium phosphate are between one-half and one-fifth that of the usual KDP crystal. The modulation power is, of course, reduced by a factor of one-fourth to one twenty-fifth.

As in the case of the "straight shot" modulator of FIG. 2, the bandwidth of the modulator of FIG. 5 is ultimately determined by the frequency range over which the velocity of the modulating signal is substantially constant, this being determined by the type of transmission line structure and the dielectric constant of the line. The radio frequency transmission characteristics of the line structure being very similar in both cases, the multireflection embodiment is also capable of handling extremely wide modulation bandwidths.

Because of the ease of phase detection of the modulation, this present modulator is most conveniently used with coherent light, such as is available from a laser of either the solid state or gaseous type. However, the modulator is also capable of modulating non-coherent light.

From the foregoing it will be apparent that applicant has provided a modulator for plane-polarized light which is relatively simple to construct, and which achieves modulation with a modest modulation power. Because of the simple transmission line structure, which in all of the disclosed embodiments is of uniform cross-section throughout its length, it appears possible to match the velocity of the modulation signal and the light beam through the modulator over a frequency range extending from essentially D.C. to the high kilomegacycle range. Significantly, the modulator power is independent of the bandwidth of the modulation signal. Although there has been shown and described what are now regarded as preferred embodiments of the invention, changes and modifications will occur to one skilled in the art. It is the intention, herefore, that the invention not be limited by the exact features shown and described except as such limitation appear in the appended claims.

What is claimed is:

1. A light modulator comprising, a section of transmission line of the transverse electromagnetic type including a dielectric through its length at least a portion of which consists of a material which exhibits the electro-optic effect, means for directing a beam of light to be modulated into said material for propagation therein along the length direction of said line section, and means for applying a modulating signal to said line for propagation therein in the same direction as the light is propagated.

2. A modulator for a light beam comprising, a section of transmission line including a pair of spaced apart parallel plates and an elongated body of electro-optic material arranged between said plates and coextensive with said section, means for directing a beam of light to be modulated into one end of said body of electro-optic material for propagation therein along the longitudinal axis thereof, and means for applying a modulating signal to said one end of said transmission line, said body of electro-optic material constituting a portion of the dielectric of said transmission line and being dimensioned relative to the dimensions and spacing of said plates to cause the velocity of propagation of said modulating signal on said line to be equal to the velocity of propagation of said light beam through said body of electro-optic material.

3. A modulator for a light beam comprising, a section of transmission line including a pair of spaced apart parallel plates and an elongated body of electro-optic material arranged between said plates and coextensive with said section, said body of material being of uniform cross-section throughout its length, means for directing a beam of light to be modulated into one end of said body of electro-optic material for propagation therein along the longitudinal axis thereof, means for applying a modulating signal to said one end of said transmission line for propagation therein, said body of electro-optic material constituting a portion of the dielectric of said transmission line and being dimensioned relative to the dimension and spacing of said plates to cause the velocity of propagation of said modulating signal on said line to be equal to the velocity of propagation of said light beam through said body of electro-optic material, and a terminating load coupled to the other end of said line for dissipating said modulating signal after propagation through said line.

4. Apparatus in accordance with claim 3 wherein said electric-optic material is oriented with one of the minor axes of the refraction index ellipsoid parallel to the longitudinal axis of said line, and said beam of light is polarized to have its electric vector lying in a plane parallel to said plates and directed perpendicularly to the longitudinal axis of said line.

5. A modulator for a beam of light comprising, a section of transmission line including a pair of uniformly spaced conductors and an elongated body of electro-optic material of uniform cross-section and coextensive with said section disposed in the space between said conductors, the faces of said body contiguous with said conductors having a light-reflecting surface thereon, means for directing a beam of light to be modulated into said body of electro-optic material at an angle to the longitudinal axis thereof for propagation generally along the length dimension of said line and so as to experience multiple reflections from said light reflecting surfaces during propagation along said line section, means for applying a modulating signal to said transmission line for propagation therein in the same direction as the light is propagated, said body of electro-optic material constituting the dielectric of said transmission line and being dimensioned relative to the spacing of said conductors to cause the velocity of propagation of said modulating signal on the line to equal the velocity of propagation of said light beam through said body of electro-optic material.

6. A modulator for a beam of light comprising, a section of transmission line including a pair of uniformly spaced conductors and an elongated body of electro-optic material of uniform cross-section and coextensive with said section disposed in the space between said conductors, the faces of said body contiguous with said conductors having a light-reflecting surface thereon, means for directing a beam of light to be modulated into said body of electro-optic material at an angle to the longitudinal axis thereof for propagation generally along the length direction of said line and so as to experience multiple reflections from said light reflecting surfaces during propagation along said line section, means for applying a modulating signal to said line for propagation therein in the same direction as the light is propagated, said body of electro-optic material constituting the dielectric of said transmission line and being dimensioned relative to the spacing of said conductors to cause the velocity of propagation of said modulating sginal on the line to equal the velocity of propagation of said light beam through said body of electro-optic material, and a terminating load coupled to said line section for dissipating said modulating signal after propagation through said line section.

7. A modulator for a beam of light comprising, a section of transmission line including a pair of parallel flat conductors and an elongated body of electro-optic material of uniform cross-section and coextensive with said section disposed in the space between said conductors, said electro-optic material being oriented with one of either its $x$- or its $y$-axis parallel to the longitudinal axis of said line, the faces of said body contiguous with said conductors having a light-reflecting surface thereon means for directing, a beam of light polarized with its electric vector in a predetermined relationship with the $x$- and $y$-axis of said electro-optic material into said body of electro-optic material at an angle to the longitudinal axis thereof for propagation generally therealong and so as to experience multiple reflections from said light-reflecting surfaces during propagation along the length dimension of said line section, and means for applying a modulating signal to said transmission line for propagation therein in the same direction as the light is propagated, said material constituting the dielectric of said transmission line and being dimensioned relative to the spacing of said conductors to cause the velocity of propagation of said modulating signal on the line to equal the velocity of propagation of said light beam through said body of electro-optic material.

8. A light modulator according to claim 1 in which said transmission line is a parallel conductor transmission line, and said electro-optic material is a body of crystalline electro-optic material disposed between said parallel conductors and coextensive therewith.

9. A light modulator according to claim 8 in which said light to be modulated has its electric vector in a predetermined relationship with the axes of said electro-optic material.

10. Apparatus for the wideband phase modulation of a light beam comprising a TEM mode transmission line having a pair of coaxially disposed conductors, an elongated body of electro-optic material of uniform cross-section disposed in the space between said conductors and coextensive therewith, means for applying a modulating signal to one end of said transmission line to produce an electric field between said two conductors, and means for directing a beam of coherent light to be modulated into said one end of the body of electro-optic material for propagation along the longitudinal axis thereof.

11. Apparatus according to claim 10 in which said electro-optic material has $x$, $y$ and $z$ axes and is disposed between said conductors with its $z$ axis orthogonal to the length of said body of material.

12. Apparatus according to claim 11 in which said light beam is oriented with its electric vector parallel to either the $x$ or $y$ axis of said electro-optic material.

13. Apparatus according to claim 10 further including a terminating load coupled to the other end of said transmission line for dissipating said modulating signal after propagation through said line.

References Cited by the Examiner

UNITED STATES PATENTS

| 2,692,952 | 10/1954 | Briggs | 250—199 |
| 2,714,191 | 7/1955 | Cayzac | 332—51 |
| 2,728,050 | 12/1955 | Van De Lindt | 332—51 |
| 2,780,958 | 2/1957 | Wiley | 88—61 |
| 2,788,710 | 4/1957 | West | 88—65 |
| 3,133,198 | 5/1964 | Kaminow et al. | 250—199 |
| 3,153,691 | 10/1964 | Kibler | 88—61 |
| 3,239,670 | 3/1966 | Bloembergen | 250—199 |

OTHER REFERENCES

Blumenthal: Proc. I.R.E., vol. 50, No. 4, April 1962, pp. 452–456.

DAVID G. REDINBAUGH, *Primary Examiner.*

J. W. CALDWELL, *Assistant Examiner.*